United States Patent
Cheng (10) Patent No.: US 7,616,267 B2
(45) Date of Patent: Nov. 10, 2009

(54) PIXEL STRUCTURE FOR FLAT PANEL DISPLAY

(75) Inventor: Yi-Sheng Cheng, Hsinchu (TW)

(73) Assignee: AU Optronics Corp., Hsinchu (TW)

( * ) Notice: Subject to any disclaimer, the term of this patent is extended or adjusted under 35 U.S.C. 154(b) by 340 days.

(21) Appl. No.: 11/559,423

(22) Filed: Nov. 14, 2006

(65) Prior Publication Data

US 2007/0291193 A1    Dec. 20, 2007

(30) Foreign Application Priority Data

Jun. 19, 2006    (TW) .............................. 95121862 A (51) Int. Cl.
*G02F 1/1343*    (2006.01)
(52) U.S. Cl. .............................. 349/38; 349/39; 349/43; 349/47
(58) Field of Classification Search .................... 349/47
See application file for complete search history.

(56) References Cited

U.S. PATENT DOCUMENTS

| | | | | |
|---|---|---|---|---|
| 5,121,236 | A * | 6/1992 | Ukai et al. | 349/55 |
| 6,238,754 | B1 * | 5/2001 | Shohara et al. | 428/1.5 |
| 6,822,703 | B2 * | 11/2004 | Hwang et al. | 349/43 |
| 2002/0176042 | A1* | 11/2002 | Moon et al. | 349/123 |
| 2003/0016309 | A1* | 1/2003 | Ha | 349/43 |
| 2003/0086046 | A1 | 5/2003 | You | |
| 2003/0127652 | A1 | 7/2003 | Park et al. | |
| 2005/0001959 | A1* | 1/2005 | Chang | 349/114 |
| 2005/0218407 | A1 | 10/2005 | Matsuura et al. | |

FOREIGN PATENT DOCUMENTS

| | | |
|---|---|---|
| CN | 1567029 | 1/2005 |
| CN | 1745480 | 3/2006 |
| JP | 2002184999 | 6/2002 |
| JP | 2002341382 | 11/2002 |
| JP | 2005064337 | 3/2005 |

OTHER PUBLICATIONS

China Office Action mailed Aug. 17, 2007.
TW Office Action mailed Apr. 29, 2008.

* cited by examiner

*Primary Examiner*—Uyen-Chau N Le
*Assistant Examiner*—Chad H Smith
(74) *Attorney, Agent, or Firm*—Thomas, Kayden, Horstemeyer & Risley (57) ABSTRACT

A pixel structure of a flat panel display for arrangement on a substrate. The pixel structure comprises a storage capacitor, a thin film transistor (TFT) and a data line formed on the substrate. The storage capacitor is disposed on the substrate, comprising a lower metal layer, an upper metal layer and a capacitor dielectric layer disposed therebetween. The TFT is disposed on the substrate and electrically connected to the storage capacitor, comprising an active layer, a gate electrode, and a gate dielectric layer disposed therebetween. The data line is disposed on the substrate, electrically connected to the thin film transistor and insulated from the substrate. The upper metal layer and the gate electrode are formed by the same metal layer and the lower metal layer and the data line are formed by the same metal layer. The invention also discloses a method for fabricating the pixel structure.

8 Claims, 9 Drawing Sheets

PIXEL STRUCTURE FOR FLAT PANEL DISPLAY

BACKGROUND OF THE INVENTION

1. Field of the Invention

The invention relates to a flat panel display (FPD), and in particular to a pixel structure for a low temperature polysilicon type FPD capable of increasing capacitance of the storage capacitor and a method for fabricating the same.

2. Description of the Related Art

Due to the advantages of thin profile and low power consumption, liquid crystal displays (LCDs) are widely employed in electronic products, such as portable personal computers, digital cameras, mobile phones and the like. During the fabrication of LCD pixels, however, several lithography processes are required, such that the manufacturing process is complex and costs are increased.

Figure 1A:
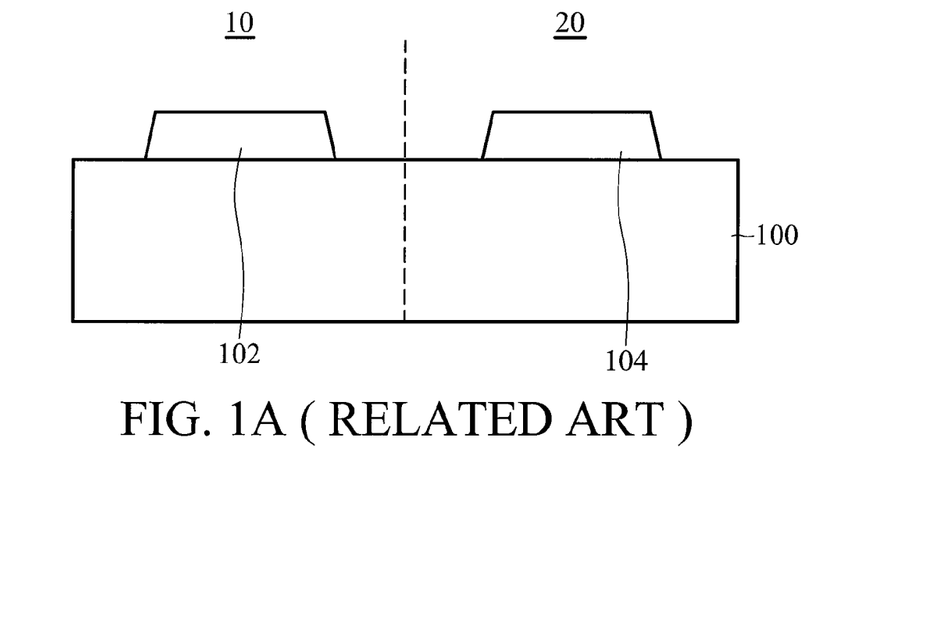
FIGS. 1A to 1F are cross-sections of a conventional method for fabricating a pixel structure of a low temperature polysilicon type LCD.

FIGS. 1A to 1F illustrate a conventional method for fabricating a pixel structure of a low temperature polysilicon type LCD. In FIG. 1A, a transparent substrate 100 comprising a transistor region 10 and a capacitor region 20 is provided. Semiconductor layers 102 and 104 are formed on the transistor region 10 and the capacitor region 20 of the substrate 100, respectively, by conventional deposition, lithography and etching. The semiconductor layer 102 formed on the transistor region 10 serves as an active or channel layer for a thin film transistor.

Figure 1B:
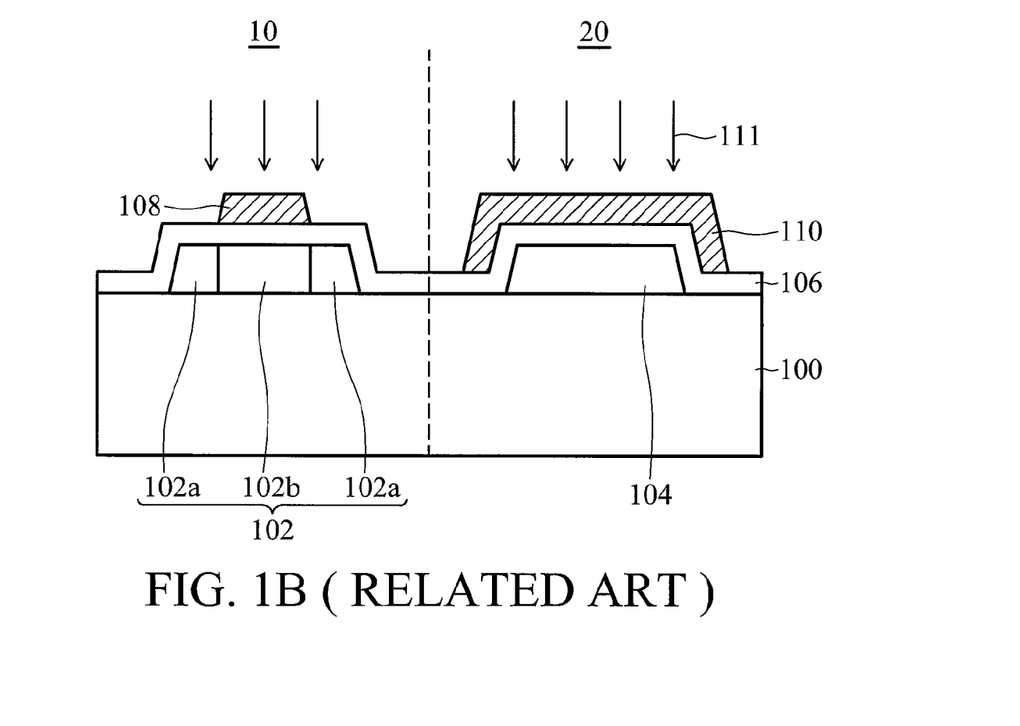

As shown in FIG. 1B, an insulating layer 106 is formed on the substrate 100 and covers the semiconductor layers 102 and 104, in which the insulating layer 106 formed in the transistor region 10 serves as a gate dielectric layer. Next, a metal layer (not shown) is formed on the insulating layer, and is then patterned by lithography and etching, to form a gate electrode 108 overlying the semiconductor layer 102 and a lower metal layer 110 overlying the semiconductor layer 104. Ion implantation 111 is subsequently performed to form source/drain regions 102a and a channel region 102b in the semiconductor layer 102.

Figure 1C:
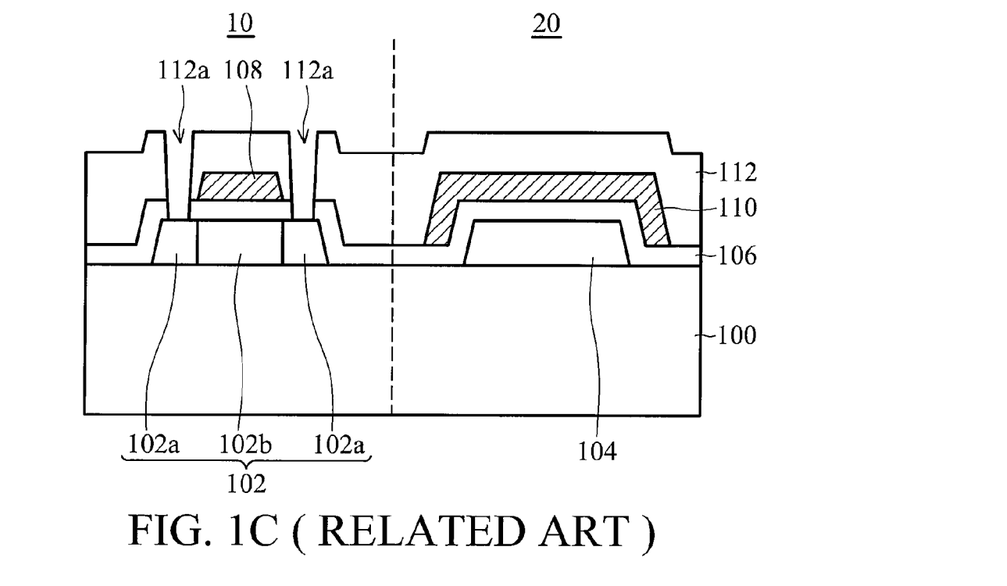

As shown in FIG. 1C, an interlayer dielectric (ILD) layer 112 is deposited on the insulating layer 106 and covers the gate electrode 108 and the lower metal layer 110. Thereafter, contact openings 112a are formed in the ILD layer 112 to expose the source/drain regions 102a. The ILD layer 112 in the capacitor region 20 serves as a capacitor dielectric layer for a storage capacitor.

Figure 1D:
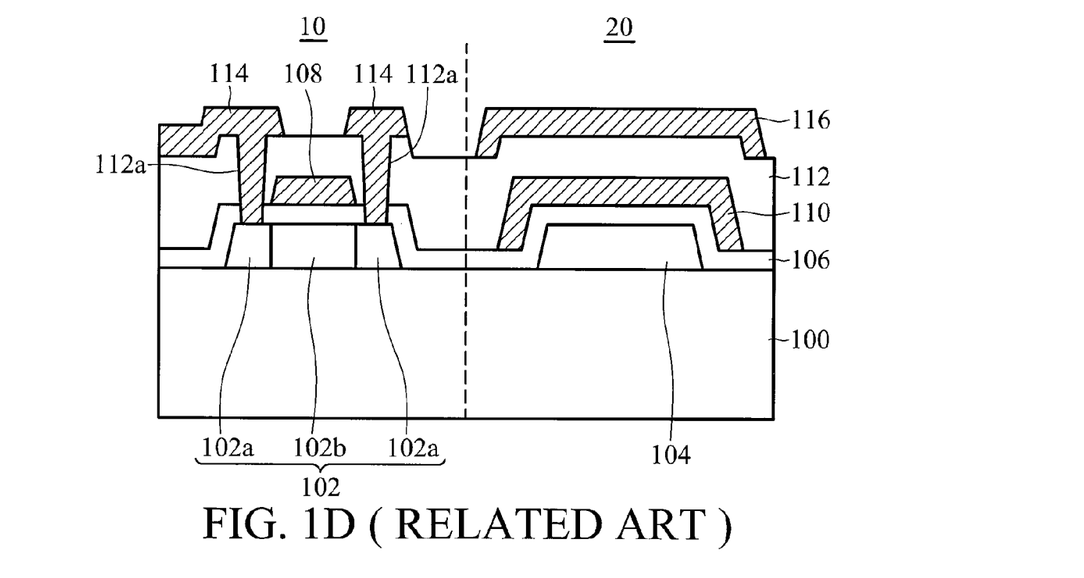

As shown in FIG. 1D, a metal layer (not shown) is formed on the ILD layer 112 and fills the contact openings 112a. Next, the metal layer is patterned by lithography and etching, to form source/drain electrodes 114 on the semiconductor layer 102 and an upper metal layer 116 overlying the lower metal layer 110.

Figure 1E:
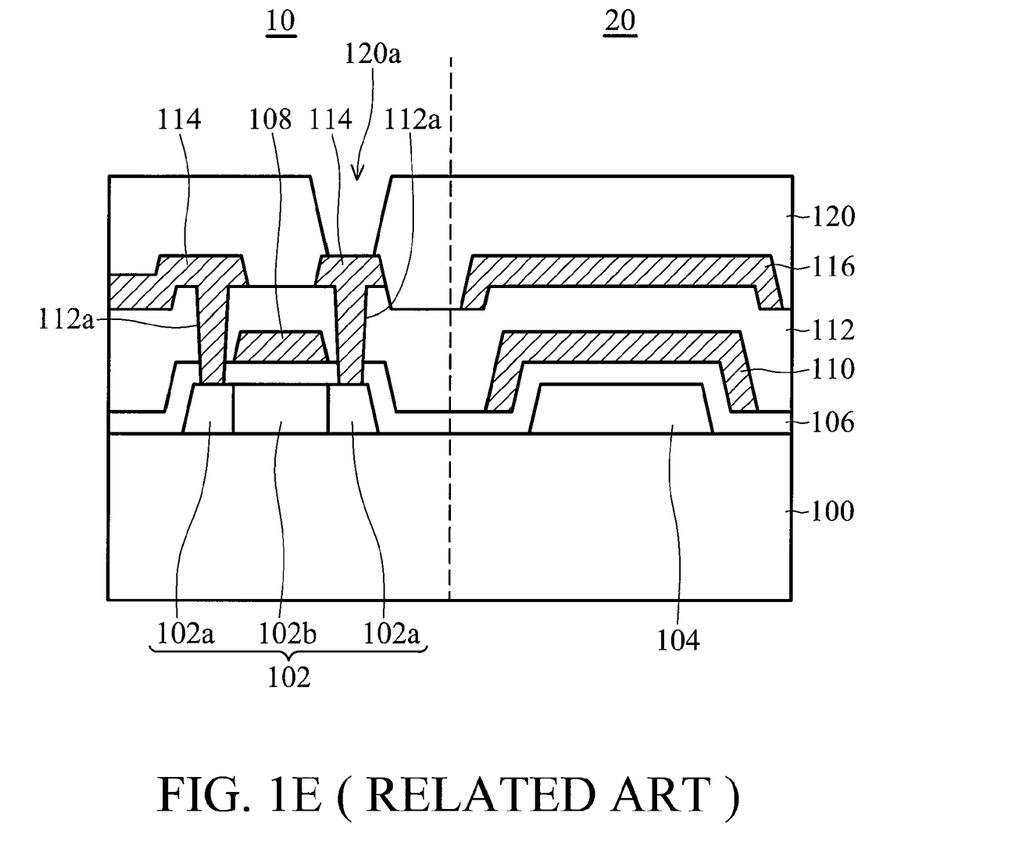
Figure 1F:
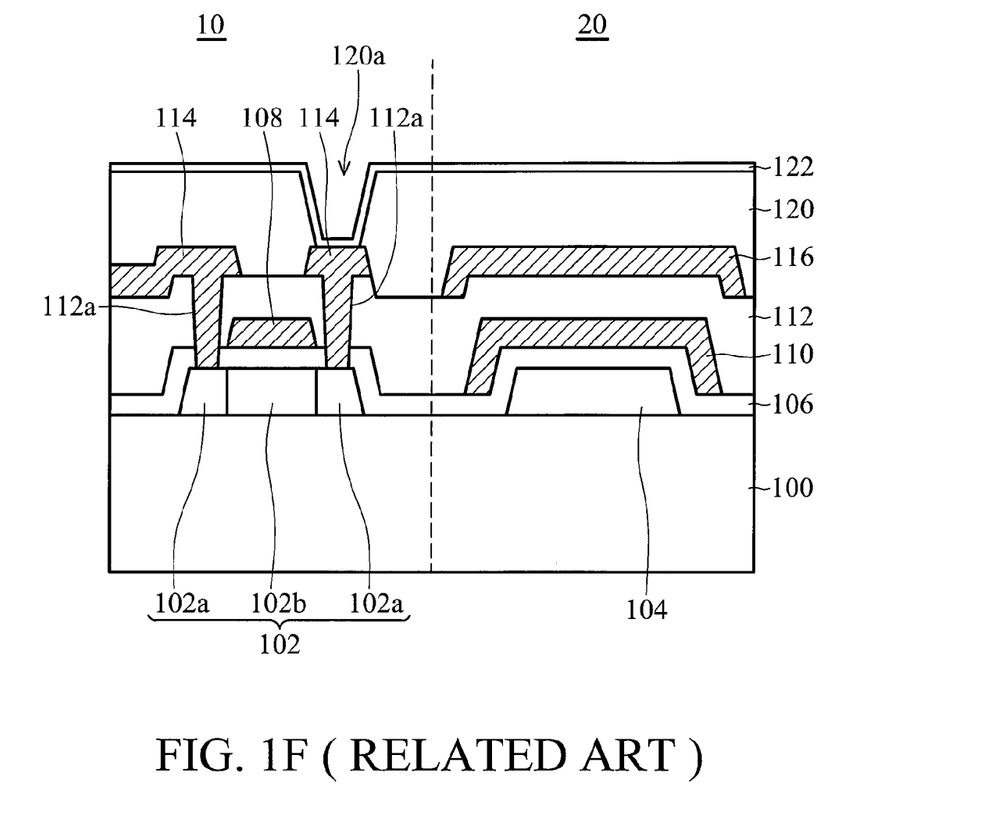

Next, a planarization layer (protective layer) 120 is formed on the ILD layer 112 and covers the source/drain electrodes 114 and the upper metal layer 116. A contact opening 120a is subsequently formed in the planarization layer 120 in the transistor region 10 by lithography and etching, to expose one of the source/drain regions 114, as shown in FIG. 1E. Next, a transparent conductive layer (not shown) is formed on the planarization layer 120 and fills the contact opening 120a. The transparent conductive layer is subsequently patterned by lithography and etching, to form a pixel electrode 122, as shown in FIG. 1F.

In such a pixel structure, at least six costly and complex lithography steps are required. Besides, since the semiconductor layer 104 cannot serve as a capacitor electrode, a thicker ILD layer 112 is served as a capacitor dielectric layer to replace the thinner insulating layer 106. As a result, capacitance of the storage capacitor is reduced.

In order to solve the described problems, there exists a need in the art for development of an improved pixel structure which can reduce the manufacturing cost and increase the capacitance of the storage capacitor.

BRIEF SUMMARY OF THE INVENTION

A detailed description is given in the following embodiments with reference to the accompanying drawings. A pixel structure of a flat panel display and a method for fabricating the same are provided. An embodiment of a pixel structure of a flat panel display for arrangement on a substrate comprises a storage capacitor, a thin film transistor (TFT) and a data line formed on the substrate. The storage capacitor is disposed on the substrate, comprising a lower metal layer, an upper metal layer and a capacitor dielectric layer disposed therebetween. The TFT is disposed on the substrate and electrically connected to the storage capacitor, comprising an active layer, a gate electrode, and a gate dielectric layer disposed therebetween. The data line is disposed on the substrate, electrically connected to the thin film transistor and insulated from the substrate. The upper metal layer and the gate electrode are formed by the same metal layer, and the lower metal layer and the data line are formed by the same metal layer. The present invention also discloses a method for fabricating the pixel structure.

An embodiment of a method for fabricating a pixel structure of a flat panel display comprises providing a substrate comprising a first region, a second region and a third region. A semiconductor layer, a first insulating layer and a first metal layer are formed on the substrate. The first metal layer, the first insulating layer and the semiconductor layer are patterned to form a lower metal layer in the first region, a data line in the third region, and an active layer on the substrate of the second region. The lower metal layer and the active layer are covered by a second insulating layer serving as a capacitor dielectric layer and a gate dielectric layer. A second metal layer is formed on the second dielectric layer. The second metal layer is patterned to form an upper metal electrode on the capacitor dielectric layer and form a gate electrode on the gate dielectric layer.

BRIEF DESCRIPTION OF THE DRAWINGS

The invention can be understood by reading the subsequent detailed description and examples with references made to the accompanying drawings, where.

DETAILED DESCRIPTION OF THE INVENTION

The present invention relates to an improved pixel structure for a FPD, and a method for fabricating the same. FIG. 2I illustrates an embodiment of a pixel structure for a FPD, such as LCD or OLED. The pixel structure comprises a substrate 200, a storage capacitor 212, a thin film transistor (TFT) 214, a data line 206c, first and second interconnect structures 218 and 220, and first and second transparent conductive layers 222 and 224. In this embodiment, the substrate 200, such as a quartz or glass substrate, comprises a first region (capacitor region) 30, a second region (transistor region) 40, and a third region (data line region) 50. The storage capacitor 212 is disposed on the substrate 200 of the first region 30, comprising a lower metal layer 206a, an upper metal layer 210a and a capacitor dielectric layer 208a disposed therebetween. The TFT 214 is disposed on the substrate 200 of the second region 40, comprising an active layer 202a, a gate electrode 210b and gate dielectric layers 204a and 208b disposed therebetween. The data line 206c is disposed overlying the substrate 200 of the third region 50. In this embodiment, the upper metal layer 210a of the storage capacitor 212 and the gate electrode 210b of the TFT 214 are formed by the same metal layer. Moreover, the lower metal layer 206a of the storage capacitor 212 and the data line 206c are formed by the same metal layer. The first interconnect structure 218 is disposed between the storage capacitor 212 and the TFT 214, thereby serving as a source/drain electrode and electrically connecting the active layer 202a and the lower metal layer 206a. The second interconnect structure 220 is disposed between the TFT 214 and the data line 206c, thereby serving as another source/drain electrode and electrically connecting the active layer 202a and the data line 206c. The first and second transparent conductive layers 222 and 224 cover the first and second interconnect structures 218 and 220, respectively.

Figure 2A:
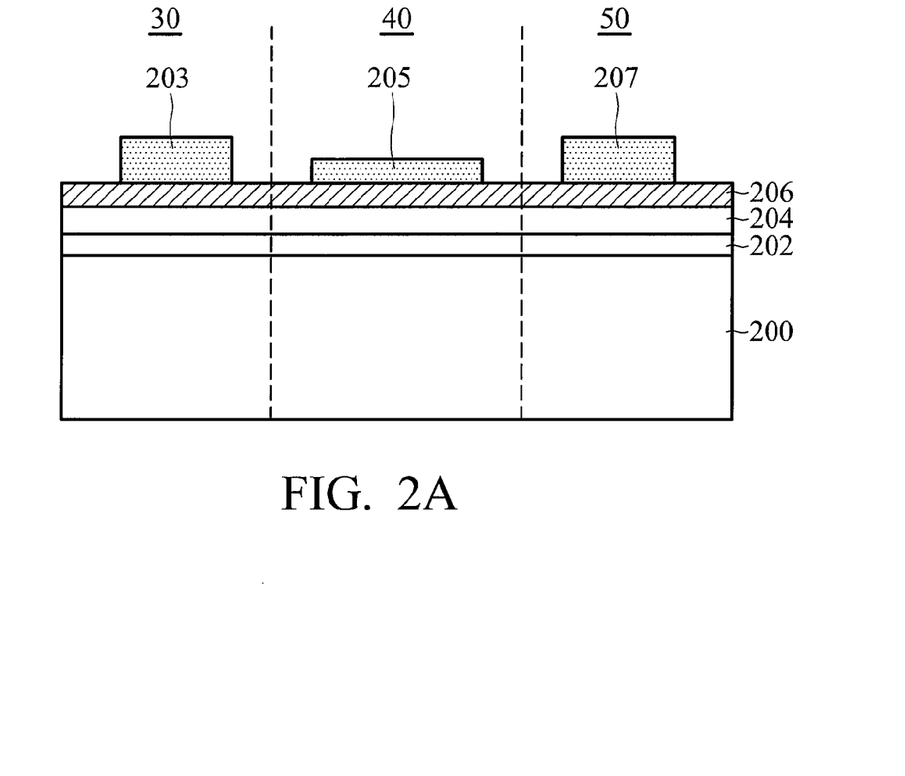
FIGS. 2A to 2I are cross-sections of an embodiment of a method for fabricating a pixel structure of an FPD.
Figure 2B:
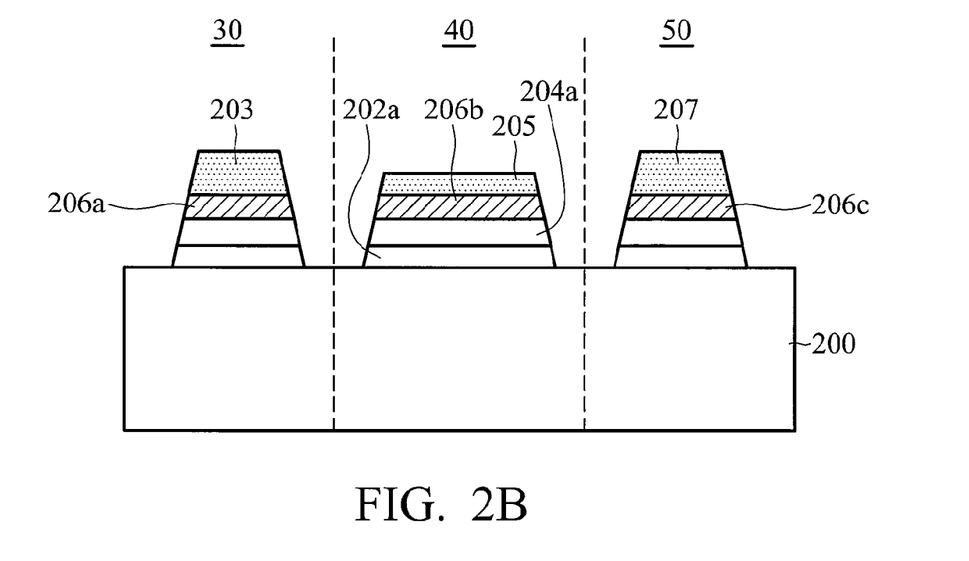
Figure 2C:
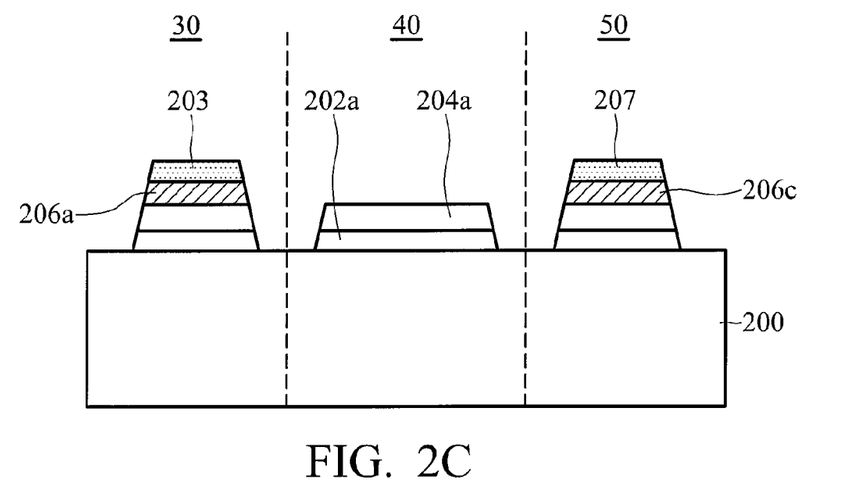
Figure 2D:
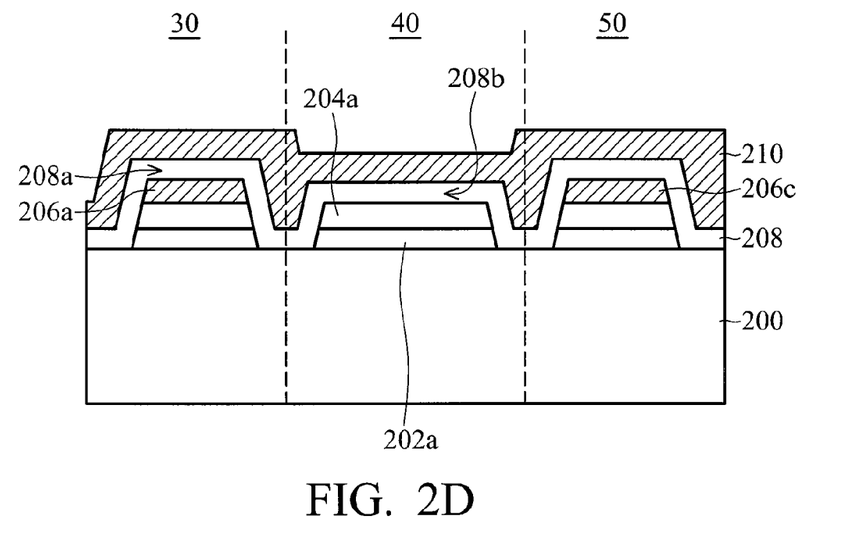
Figure 2E:
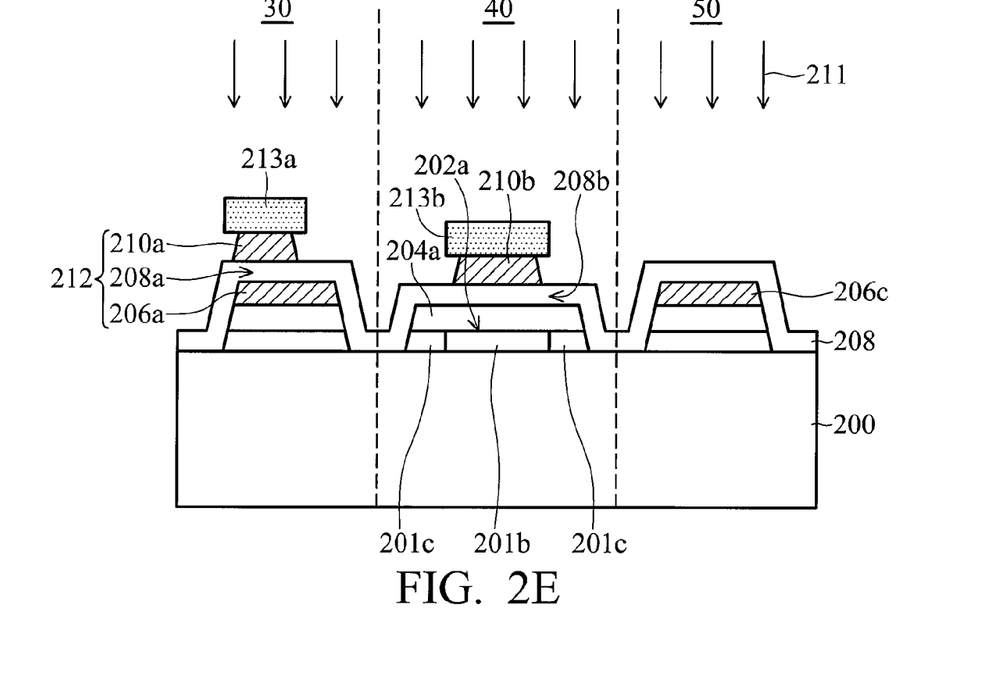
Figure 2F:
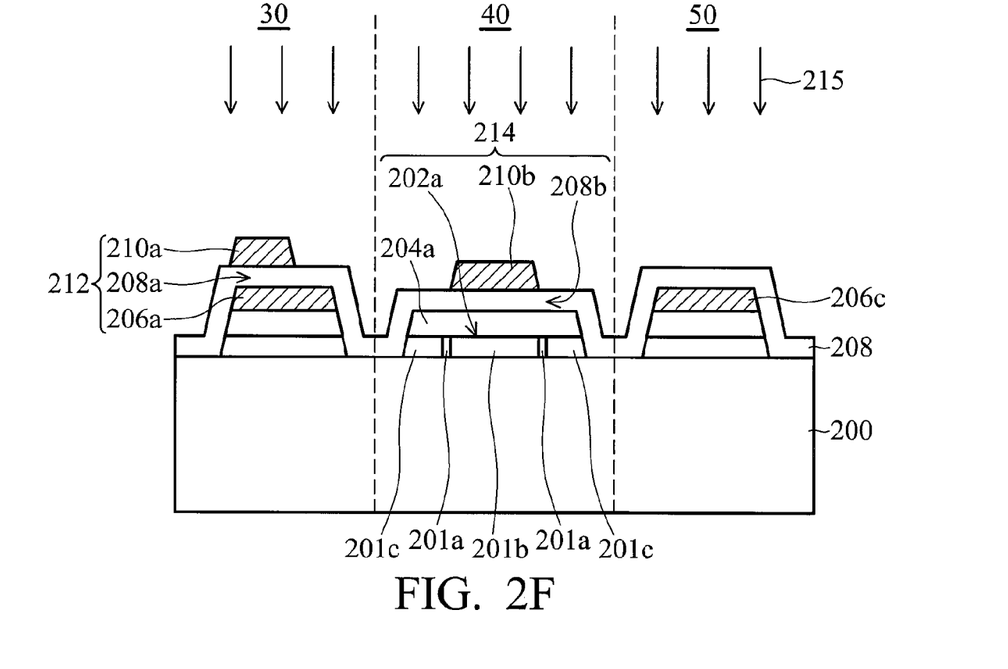
Figure 2G:
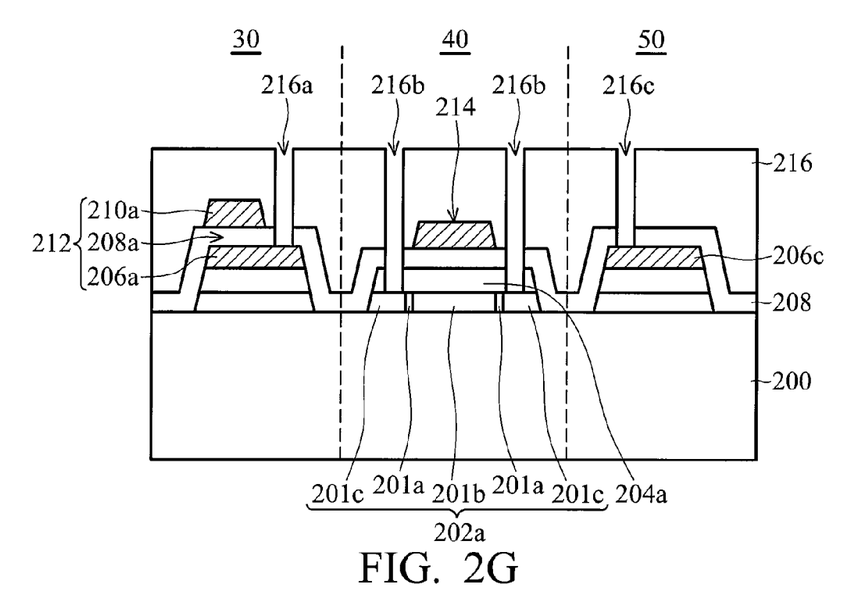
Figure 2H:
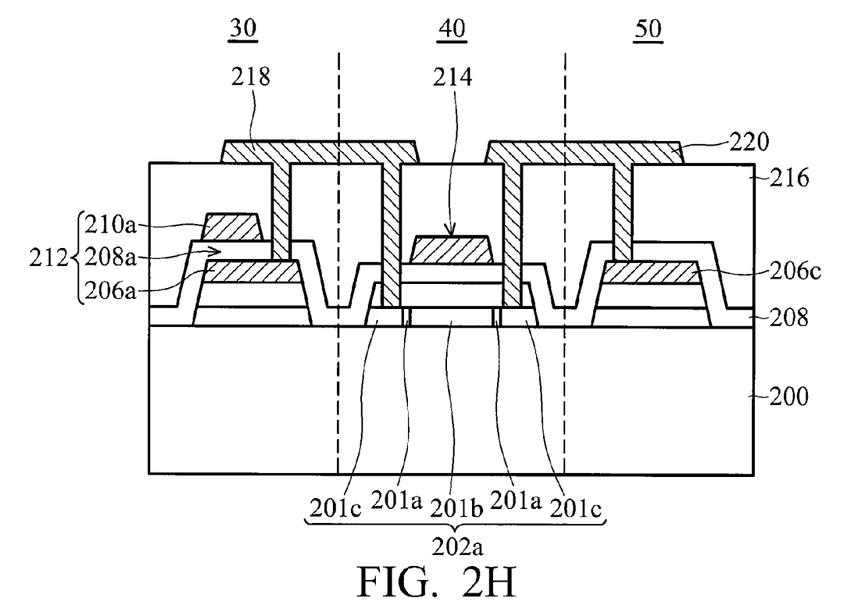
Figure 2I:
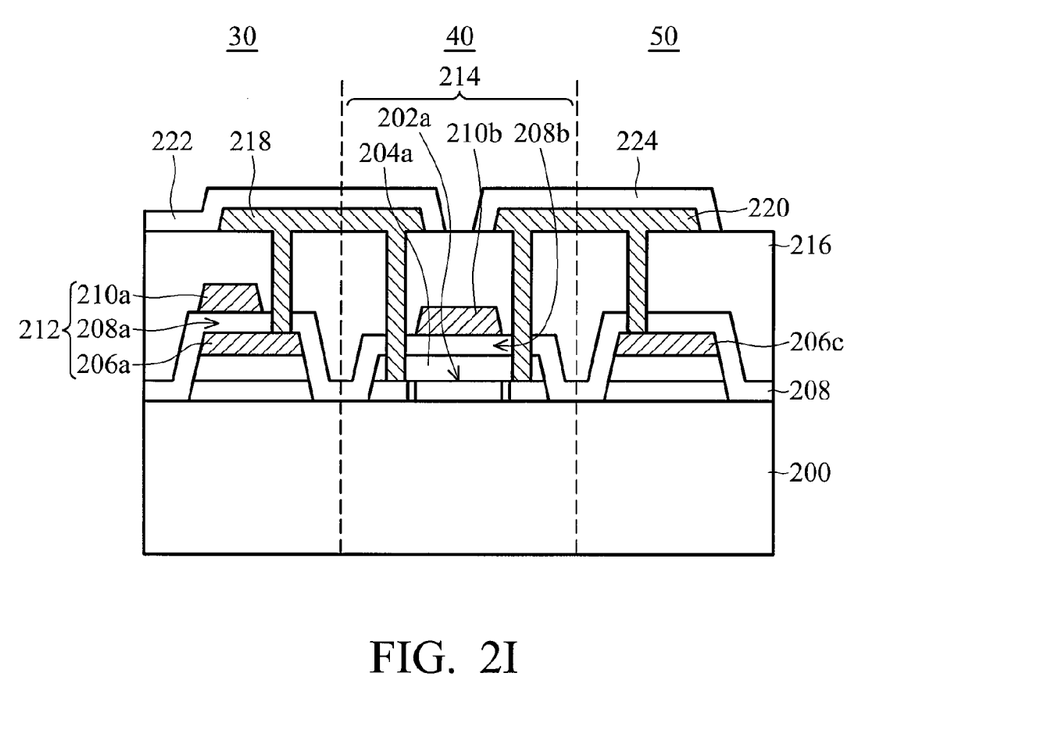

FIGS. 2A to 2I illustrate an embodiment of a method for fabricating a pixel structure. In FIG. 2A, a substrate 200, such as a quartz or glass substrate, comprises a first region (capacitor region) 30, a second region (transistor region) 40, and a third region (data line region) 50 is provided. A semiconductor layer 202, a first insulating layer 204 and a first metal layer 206 are formed on the substrate 200. In this embodiment, the semiconductor layer 202 may comprise amorphous silicon or polysilicon. For example, the semiconductor layer 202 comprises polysilicon and is formed by low temperature polysilicon (LTPS) process. The first insulating layer 204 having a thickness of about 100 Å to 1500 Å may comprise silicon oxide and is formed by chemical vapor deposition (CVD) or other conventional deposition methods. The first metal layer 206 may comprise copper, aluminum, molybdenum or a combination thereof and can be formed by CVD, sputtering, physical vapor deposition (PVD) or other conventional deposition methods.

The first metal layer 206, the first insulating layer 204 and the semiconductor layer 202 are patterned to form a lower metal layer 206a and a data line 206c in the first and third regions 30 and 50, respectively, in which the lower metal layer 206a and the data line 206c are formed by patterning the first metal layer 206. Moreover, an active layer 202a formed by patterning the semiconductor layer 202 and a first gate dielectric layer 204a formed by patterning the first insulating layer 204 are successively disposed on the substrate 200 of the second region 20. Optionally, the first gate dielectric layer 204a can be removed to leave only the active layer 202a.

For example, first, second and third masking layers 203, 205 and 207, such as photoresist layers, are formed on the first metal layer 206 by lithography. The first, second and third masking layers 203, 205 and 207 correspond to the first, second and third regions 30, 40 and 50, respectively, for definitions of the lower metal layer 206a, the active layers 202a, the first gate dielectric layer 204a and the data line 206c. The first, second and third masking layers 203, 205 and 207 can be formed using a half-tone mask, such that the second masking layer 205 has a thickness less than that of the first and third masking layers 203 and 207, as shown in FIG. 2A. Next, the first metal layer 206, the first insulating layer 204 and the semiconductor layer 202 are successively etched to form the lower metal layer 206a and the data line 206c in the first and third regions 10 and 50, respectively, and form a metal masking layer 206b, the first gate dielectric layer 204a and the active layer 202a in the second region 40, as shown in FIG. 2B. Since the second masking layer 205 is thinner than the first and third masking layers 203 and 207, the second masking layer 205 is completely removed to expose metal masking layer 206b after the etching is complete. Thereafter, the metal masking layer 206b is removed to expose the first gate dielectric layer 204a, as shown in FIG. 2C. In some embodiments, the first gate dielectric layer 204a may be removed to expose the active layer 202a.

As shown in FIG. 2D, after removal of the first and third masking layers 203 and 207, a second insulating layer 208, such as a silicon nitride, silicon oxide or other dielectric layer, is deposited overlying the substrate 200 and covers the lower metal layer 206a and the first gate dielectric layer 204a. The second insulating layer 208 can be formed by CVD or other conventional deposition and has a thickness of about 100 Å to 1500 Å. The second insulating layer 208 in the first region 30 serves as a capacitor dielectric layer 208a and that in the second region 40 serves as a second gate dielectric layer 208b. Next, a second metal layer 210 is formed on the second insulating layer 208, which may comprise copper, aluminum, molybdenum or a combination thereof and may be formed by CVD, PVD, sputtering or other conventional deposition.

As shown in FIG. 2E, the masking layers 213a and 213b are formed on the second metal layer 210 shown in FIG. 2D by lithography, which respectively correspond to the first and second regions 30 and 40 for definition of an upper metal layer and a gate electrode. The second metal layer 210 uncovered by the fourth and fifth masking layers 213a and 213b are etched to form an upper metal layer 210a on the capacitor dielectric layer 208a and form a gate electrode 210b on the second gate dielectric layer 208b, thereby forming a storage capacitor 212 in the first region 30. Thereafter, heavy doping 211 is performed to form source/drain regions 210c in the both sides of the active layer 202a.

As shown in FIG. 2F, after removal of the masking layers 213a and 213b, lightly doping 215 is performed to form lightly doped drain (LDD) regions 201a and a channel region 201b in the active layer 202a, thereby forming a TFT 214 in the second region 40. The leakage of the TFT 214 can be reduced by formation of the LDD regions 201a.

As shown in FIG. 2G, a third insulating layer 216, such as a silicon oxide, is formed on the second insulating layer 208 and covers the upper metal layer 210a and the gate electrode 210b, thereby serving as an ILD layer. Next, the third insulating layer 216, the second insulating layer 208 and the first gate dielectric layer 204a are patterned by lithography and etching, to form contact openings 216a, 216b and 216c therein. In this embodiment, the contact opening 216a is located in the first region 30 and exposes the lower metal layer 206a. The contact openings 216b are located in the second region 40 and expose the source/drain regions 201c. The contact opening 216c is located in the third region 50 and exposes the data line 206c.

As shown in FIG. 2H, a third metal layer (not shown) is formed on the third insulating layer 216 and fills the contact openings 216a, 216b and 216c. Thereafter, the third metal layer is patterned by lithography and etching, to form a first interconnect structure 218 electrically connecting the active layer 202a and the lower metal layer 206a and form a second interconnect structure 220 electrically connecting the active layer 202a and the data line 206c. The first and second interconnect structures 218 and 220 serve as source/drain electrodes of the TFT 214 and may comprise titanium, molybdenum, aluminum or chromium. First and second transparent conductive layers 222 and 224 are formed on the third insulating layer 216 and cover the first and second interconnect structures 218 and 220, respectively, as shown in FIG. 2I. The first and second transparent conductive layers 222 and 224 can be formed by patterning a transparent conductive layer, such as an indium tin oxide (ITO) or indium zinc oxide (IZO) layer. At the same time to form the first and second transparent conductive layers 222 and 224, a pixel electrode (not shown) may also be formed on the third insulating layer 216.

According to the invention, since the metal layer for providing the lower metal layer 206a of the storage capacitor 212 and the data line 206c and the semiconductor layer for providing the active layer 202a of the TFT 214 are defined by the same lithography step, the total number of lithography steps for forming the pixel structure can be reduced to simplify the manufacturing process, thereby reducing the manufacturing cost. Additionally, the lower metal layer 206a of the storage capacitor 212 is formed prior to formation of the gate dielectric layer (i.e. the second insulating layer 208) of the TFT 214. Accordingly, the thinner second insulating layer 208 can be utilized as a capacitor dielectric layer of the storage capacitor 212, thereby increasing its capacitance.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A pixel structure of a flat panel display for arrangement on a substrate, comprising:
   a storage capacitor disposed on the substrate, comprising a lower metal layer, an upper metal layer, and a capacitor dielectric layer disposed therebetween;
   a thin film transistor, disposed on the substrate and electrically connected to the storage capacitor, comprising an active layer, a gate electrode, and a gate dielectric layer disposed therebetween; and
   a data line disposed on the substrate and electrically connected to the thin film transistor;
   a first interconnect structure electrically connecting the active layer and the lower metal layer; and
   a second interconnect structure electrically connecting the active layer and the data line;
   wherein the upper metal layer and the gate electrode are formed by the same metal layer and the lower metal layer and the data line are formed by the same metal layer.

2. The pixel structure as claimed in claim 1, wherein at least one of the first and second interconnect structures comprises titanium or chromium.

3. The pixel structure as claimed in claim 1, further comprising a first and second transparent conductive layers covering the first and second interconnect structures, respectively.

4. The pixel structure as claimed in claim 1, wherein the gate dielectric layer and the capacitor dielectric layer are formed by the same insulating layer.

5. The pixel structure as claimed in claim 4, wherein the insulating layer comprises silicon nitride.

6. The pixel structure as claimed in claim 4, wherein the insulating layer has a thickness of about 100 Å to 1500 Å.

7. The pixel structure as claimed in claim 1, wherein the thin film transistor further comprises a silicon oxide layer disposed between the active layer and the gate dielectric layer.

8. The pixel structure as claimed in claim 7, wherein the silicon oxide layer has a thickness of about 100 Å to 1500 Å.

* * * * *